Aug. 7, 1956
W. S. HART
2,757,503
PACKING APPARATUS
Filed Nov. 18, 1950
4 Sheets-Sheet 3
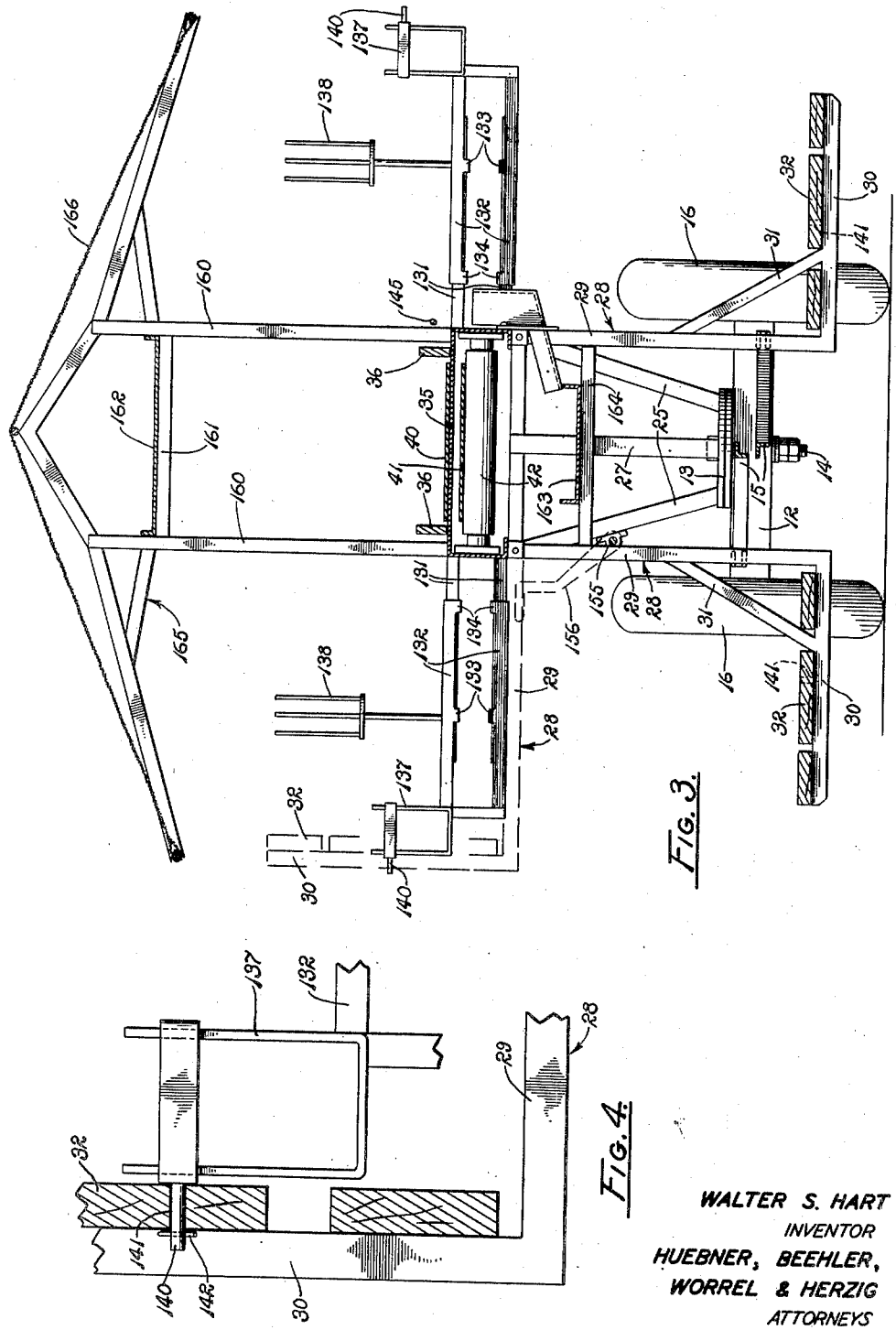
WALTER S. HART
INVENTOR
HUEBNER, BEEHLER,
WORREL & HERZIG
ATTORNEYS

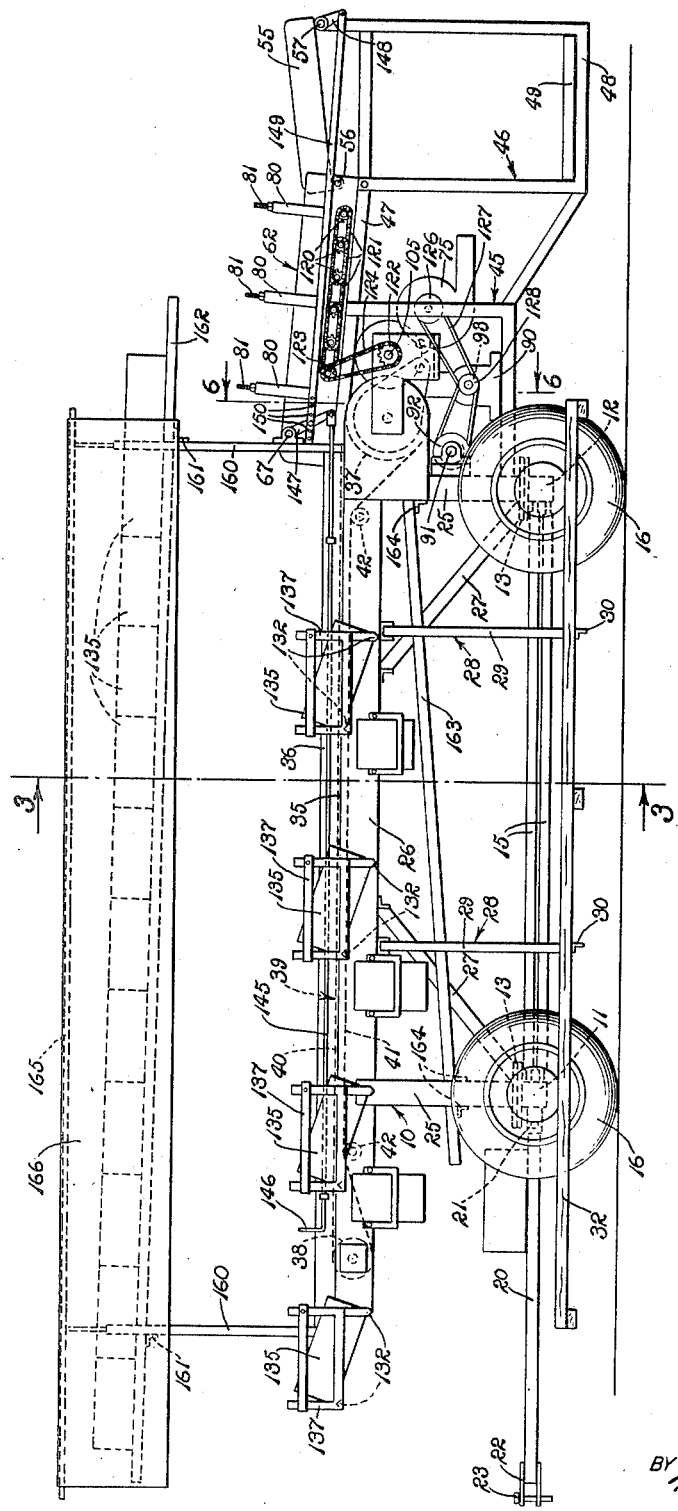

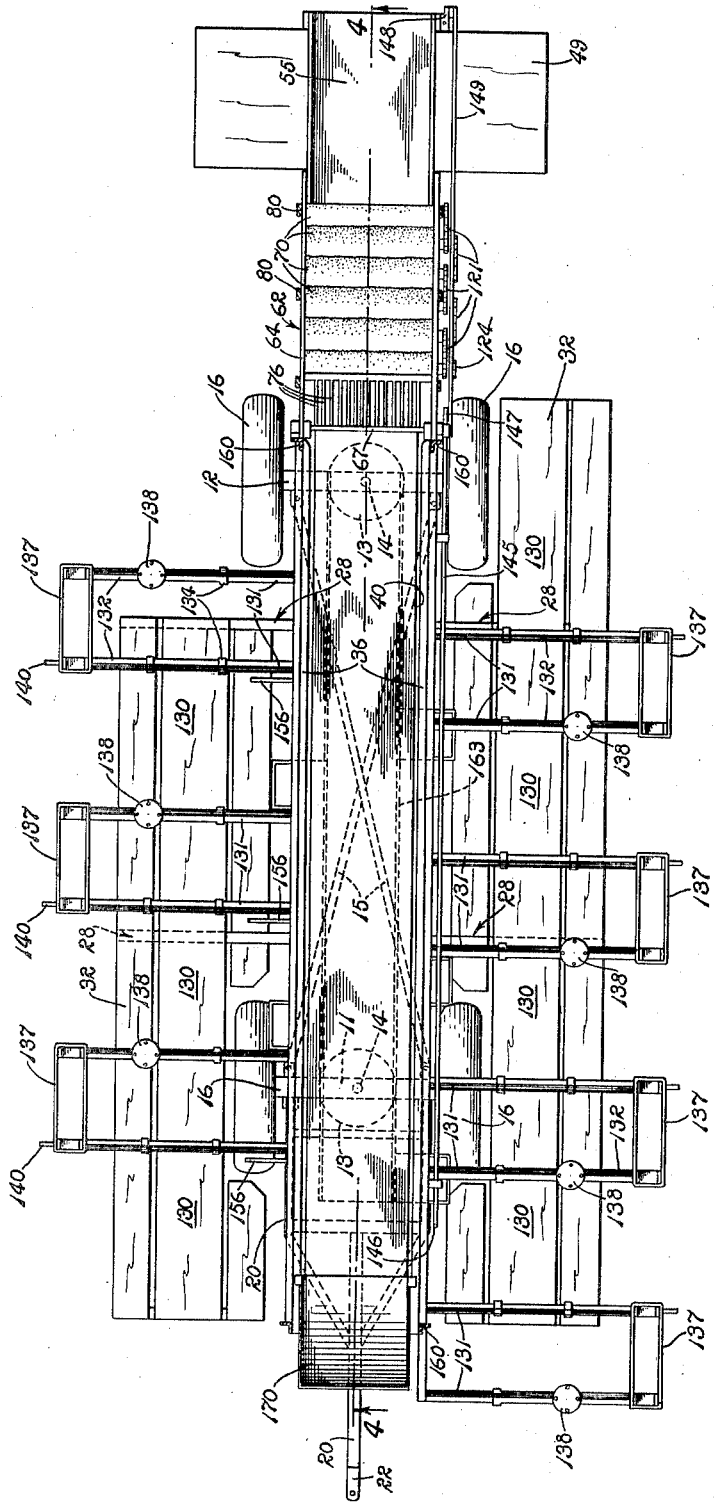

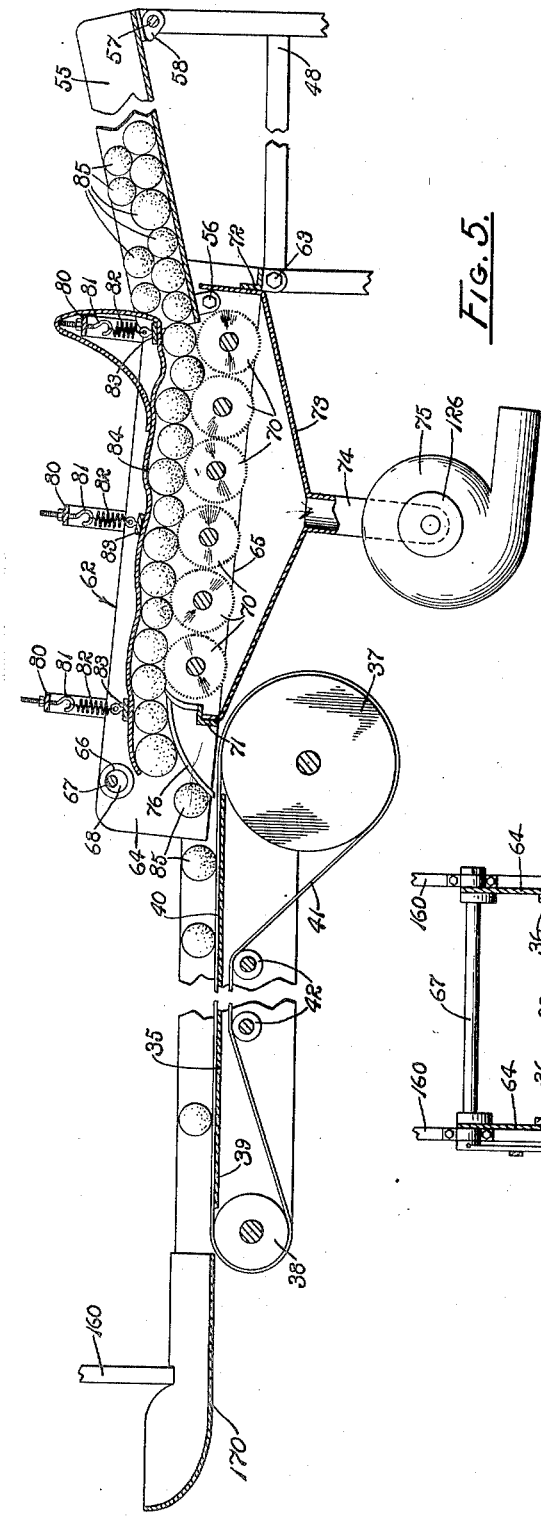

United States Patent Office 2,757,503
Patented Aug. 7, 1956

2,757,503

PACKING APPARATUS

Walter S. Hart, Del Rey, Calif., assignor of one-half to Frank Wilkins, Del Rey, Calif.

Application November 18, 1950, Serial No. 196,398

6 Claims. (Cl. 53—391)

The present invention relates to packing apparatus and more particularly to a mobile auxiliary device for the hand packing of fruit and the like in close proximity of its points of harvest.

In the harvesting and marketing of perishable fruits such as peaches, plums, apricots, nectarines, apples, pears, grapes, tomatoes, and the like, it is the usual practice for pickers to gather the fruit in the field or orchard and to deposit the same in metal buckets or pans which are subsequently emptied into picking boxes. Actual field tests indicate that frequently twenty percent or more of the fruit is damaged to such an extent during the harvesting and conveyance to the picking boxes to preclude its use for other than stock feed or other by-product. The picking boxes are gathered by means of vineyard or orchard trucks which characteristically jostle the boxes and their contents further reducing the quality of the harvested produce and subjecting it to abrasion and bruising. At packing sheds, the fruit contained by the picking boxes is hand sorted and that of sufficient quality and good condition packed into containers for market. The packed marketing containers are subsequently conveyed to wholesale markets or other points of sale by refrigerated railway cars or the like. The bruishing, abrasion, and damage to even the selected fruit, during the harvesting and packing, is so great that it is the conventional practice to fumigate such refrigerated railway cars and the like in order to retard decay during shipment and marketing.

In order to minimize harvesting and packing damage to the fruit, it is the usual practice to harvest the same long prior to maturity so that the fruit is of sufficient firmness to resist the bruising and abrading incident to picking, depositing in the picking boxes, transporting of the picking boxes to the packing shed, and actual packing operations. In order to possess such resistance to damage, many of the fruits must be harvested before acquiring maturity, before attaining their full flavor and sugar content, and prior to achieving their full weight and size. Such premature harvesting, although required by conventional harvesting and packing practices, is objectionable to both the farmer, because of the reduced weight, size, and quality, and to the consumer because of the resultant unnecessarily increased cost and impaired quality.

An object of the present invention, therefor, is to provide an improved mobile picking apparatus for field and orchard use conducive to the marketing of perishable fruits and the like in improved condition.

Another object is to provide a packing apparatus adapted to minimize the handling of perishable fruits during the harvesting and packing thereof and the damages incident thereto.

Another object is to provide a packing apparatus enabling the packing of perishable fruits in such a manner that the farmer may permit his fruit to reach full, or nearly full, maturity before harvest without subjecting the fruit to the conventionally experienced damage thereto.

Another object is materially to reduce the handling of fruit and the like during harvesting and packing thereof.

Another object is to provide an improved packing apparatus substantially reducing the conventionally experienced packing expenses and minimizing the extent of fruit normally lost by culling operations.

A further object is to provide a mobile packing apparatus that is convenient to employ, readily adjusted in conformity to the packing speeds of operators thereof, economical to produce, and durable in orchard and field operation.

Still further objects and advantages will become apparent in the subsequent description in the specification.

Referring to the drawings:

Fig. 1 is a side elevation of a mobile packing apparatus embodying the principles of the present invention.

Fig. 2 is a plan view of the packing apparatus shown in Fig. 1.

Fig. 3 is a vertical section taken on line 3—3 of Fig. 1.

Fig. 4 is an enlarged fragmentary elevational view showing the ends of bracket arm extensions shown in Fig. 3 in supporting relation to platforms as arranged for non-packing earth traversing movement.

Fig. 5 is a fragmentary longitudinal section of a hopper, defuzzing apparatus, and conveyor employed in the apparatus of the present invention, as taken on line 4—4 of Fig. 2.

Fig. 6 is a fragmentary transverse sectional view of the apparatus taken on line 6—6 of Fig. 1.

Referring in greater detail to the drawings:

A mobile support frame is illustrated generally at 10 in the drawings provided with a front axle 11 and rear axle 12. The frame is preferably supported on the axles by means of the well known fifth wheels 13 for pivotal movement about axle mounting pins 14. As shown in Fig. 2, diagonal cross ties 15 pivotally interconnect diagonally opposite ends of the axles 11 and 12 so that the axles are constrained to substantially equal opposite pivotal movement relative to the frame. Support wheels 16 are journaled on the open ends of the axles. So supported for earth traversing movement, the frame is capable of traversing sharp turns and possesses the required mobility for field, vineyard and orchard use.

A draft yoke 20 is connected to the front axle 11 for vertical pivotal movement, as at 21. The yoke provides a forwardly extended end portion 22 which is preferably bifurcated for convenience of connection to a draft appliance employed in leading relation thereto. A pin 23, passed through the bifurcated forward end portion 22 of the yoke facilitates connection to such a draft appliance, not shown.

The support frame is conveniently fabricated from angle iron, channel iron, or the like and provides upwardly divergent legs 25 supported on the fifth wheels 13 and in turn supporting an elongated substantially rectangular top portion 26. Angularly disposed braces 27 interconnect the lower end portions of the legs and the top portion to impart desired rigidity to the frame. As clearly evident in Figs. 1 and 3, angle brackets 28 are pivotally dependently supported on the top portion 26 of the frame and successively downwardly and outwardly extended therefrom. The brackets have substantially vertical portions 29, substantially horizontal portions 30, and braces 31 angularly connected therebetween. Substantially horizontal platforms 32 are mounted on the horizontal portions of the brackets and serve to support packers, not shown, for the fruit packing operations. The platforms 32 are of necessity quite low so that packers supported thereon are maintained at a proper height relative to packing aids, about to be described, for packing convenience. Low platforms make it difficult to transport the apparatus of the present invention over uneven terrain, even when not being employed for packing purposes. As shown in Fig. 3, this difficulty is overcome by pivoting the brackets 28 upwardly into the position shown in dashed lines so that the entire structure is at an elevation adequate to clear all normally encountered obstructions.

An inverted U-shaped, elongated, substantially rectangular table 35 is rigidly mounted on the top portion 26 of the frame whereby the jostling of the frame incident to earth traversing movement is communicated directly to the table. A pair of substantially parallel walls 36 are mounted on the table 35 longitudinally of the frame. A drive roller 37 is rotatably mounted in the rearward end portion of the table and an idler roller 38 rotatably mounted in the forward end portion of the table, said rollers having peripheries in tangential relation to a plane common to the top of the table, as shown in Fig. 5. An endless belt conveyor 39 is mounted for circuitous travel about the rollers 37 and 38 in response to driven rotation of the roller 37 subsequently described. The conveyor provides an upper run 40 rested on the table 35 between the walls 36 and a lower run 41 supported for rearward travel in the frame by auxiliary idler rollers 42.

As most clearly shown in Fig. 1, an engine support frame 45 is rigidly mounted on the rearward end portion of the frame 10, as by welding, and rearwardly extended therefrom. An extension 46 of the engine frame is continued rearwardly providing with the engine frame a pair of substantially parallel top members 47 longitudinally of the frame and a pair of substantially parallel lower members 48 longitudinally of the frame at substantially the same elevation as the horizontal portions 30 of the brackets 28. Floor boards 49 are mounted transversely of the frame on the lower members 48 of the extension 46.

A hopper 55, having an open forward end portion pivotally mounted on the top members 47 of the extension 46 by means of a horizontal, transversely disposed, pintle 56, is adapted to receive fruit and to discharge the same at rates determined by its inclination. A hopper control shaft 57 is journaled in the extension 46 adjacent to the rearward end portion of the hopper and provides eccentrics 58 in circumscribing relation thereto, as shown in Fig. 5. The rearward end portion of the hopper 55 is rested on the eccentrics and elevationally adjusted by rocking of the control shaft.

An elongated defuzzing trough, indicated generally at 62, has a rearward end portion pivotally mounted on the top members 47 of the extension 46 adjacent to the forward end portion of the hopper on a pintle 63 and is forwardly extended therefrom. The trough conveniently provides substantially parallel sides 64, a substantially open bottom 65, and open forward and rearward ends. The sides 64 are provided with transversely aligned bores 66 near the forward end of the trough. A trough control shaft 67 is rotatably mounted in the top members 47 of the engine support frame 45 and extended through the bores. Eccentrics 68 are mounted on the shaft 67 in the bores 66 so that rocking of the shaft regulates the elevational positioning of the forward end portion of the trough.

A plurality of cylindrical brushes 70 are rotatably mounted in substantially parallel, horizontal positions in the sides of the defuzzing trough collectively in substantially closing relation to the bottom of the trough. As shown in Fig. 5, a cross member 71 is mounted transversely in the trough forwardly adjacent to the brushes and a second cross member 72 mounted in the trough rearwardly adjacent to the brushes. A patulous funnel is secured to the cross members 71 and 72 and to the sides 64 and located below the brushes 70. The funnel provides a downwardly extended conduit 74 to which the intake of a blower 75, subsequently more fully described, is connected. A fruit discharging ramp 76 is mounted on the forward cross member 71 intermediate the sides 64 of the trough 62 in substantially fitted association with the forwardmost of the brushes 70, as shown, and downwardly inclined for the gentle conveyance of fruit passed over the brushes onto the conveyor 39.

A plurality of arch members 80 interconnect the sides 64 of the defuzzing trough 62. The arch members mount for adjustable elevational control pairs of hooks 81. Helical springs 82 are dependently mounted on the hooks and support for floating movement bars 83 transversely of the trough. An elongated flexible sheet member 84 has a rearward end portion connected to the rearwardmost arch member 80 and extends from a position rearwardly of the rearwardmost bar 83 under the bars in overlying relation to the brushes 70. As fruit, illustrated at 85, is deposited in the hopper 55 gravitates into the defuzzing trough 62 and passes between the sheet 84 and the brushes 70 which serve to clean and/or defuzz the fruit. The bars 83 resiliently depress the sheet and maintain the fruit in brush engagement during passage through the trough. It is to be noted that the hopper 55 is rearwardly inclined and that the defuzzing trough is forwardly inclined.

To motivate the conveyor 39 the brushes 70 and the blower 75, a gasoline engine 90, or other suitable source of power, is mounted in the engine support frame 45, as shown in Fig. 1. A shaft 91 is rotatably mounted in the engine frame 45 forwardly of the engine and has driven connection with the engine by means of a pulley 92 mounted on the shaft, a driving pulley 93 provided by the engine, and a V belt or other suitable linkage circumscribing the pulleys.

A reduction transmission 98 is mounted in the engine frame 45 in driven connection with the shaft 91 by means of a clutch 99. The transmission is provided with a sprocket designated at 100.

A counter-shaft 105 is rotatably mounted in the engine frame 45 rearwardly and above the shaft 91. A sprocket 106 is mounted on the counter-shaft in the plane of the sprocket 100 and a chain 107 employed for driving interconnection of the sprockets.

A second transmission 110 is mounted in the engine frame adjacent to the counter-shaft 105 and a pair of sprockets 111 and 112 mounted on the counter-shaft and second transmission, respectively, are interconnected in driven association by a chain 113. A drive sprocket 114 mounted on the transmission 110 motivates a driven sprocket 115 mounted coaxially with the drive roller 37, by means of a chain 116.

A sprocket 120 is mounted coaxially with each of the brushes 70 exteriorly of a side of the trough 62. Chains 121 interconnect pairs of the sprockets 120 for corresponding rotational movement. A sprocket 122 mounted on the counter-shaft 105 a sprocket 123 mounted on one of the brushes, and a chain 124 provide convenient driving connection between the counter-shaft and the several sprockets 120 mounted with the brushes 70.

The blower 75 has a sheave 126 mounted thereon which is driven by means of a belt 127 having driven connection with a sheave 128 mounted on the engine 90. It will be seen that with the engine running and the clutch 99 establishing driven connection with the transmission 98, the brushes are rotated in a counterclockwise direction, as viewed in Fig. 5, at a speed commensurate with the cleaning and/or defuzzing of fruit fed through the trough 62, the conveyor 39 is traveled so that the upper run thereof moves forwardly in the frame at a speed convenient to the sorting and packing of the fruit 85 and the blower 75 is operated at a high speed to draw dust, dirt, debris, fuzz and the like downwardly from the brushes 70 and to discharge such material rearwardly from the apparatus.

A plurality of packing stations designated generally by the numeral 130 are provided along each side of the conveyor. It is desirable to support packing containers, such as lug boxes, in inclined positions at each packing station. To this end pairs of rigid bracket arms 131, fabricated from angle iron or the like and weldably secured to the frame, are laterally extended therefrom. On the left side of the frame, the rearwardmost of each bracket arm of each pair is mounted at approximately the same height as the bottom of the table 35 and the forwardmost bracket arm of each pair mounted at approximately the height of the top of the table. The bracket arms of each of the pairs 131 on the right side of the frame are mounted at heights corresponding to that of the bracket arms on the left side except that the forwardmost bracket arm of each pair is the lower bracket arm and the rearwardmost bracket arm the higher. Each bracket arm of each pair 131 is provided with a rigid telescopic bracket extension 132 constrained to slidable movement in substantial alignment with its respective bracket arms by slidable clips 133 and 134 rigidly mounted on the bracket extensions in bracket arm embracing relation. When fruit containers, such as shown at 135, are rested on the bracket arms 131 and bracket extensions 132, they assume the inclined position shown in Fig. 1. The telescopic association of the bracket arms and their bracket extensions serves to accommodate boxes of different widths and in multiples, if desired. The telescopic feature also permits the narrowing of the apparatus for use between rows of vines or trees that are in close proximity and permits a convenient support of the platforms 32 in raised position, as shown in Figs. 3 and 4 and soon described in greater detail.

In actual use, a rack 137 for container pads and the like is mounted on the outwardly extended end portions of the bracket arm extensions 132. Similarly, frames 138 are mounted on the bracket extensions to hold fruit packing cups, when desired. The racks 137 and frames 138 form no part of the present invention but are alluded to as useful adjuncts.

Studs 140 are endwardly extended from each of the bracket arm extensions 132 and may be borne by the racks 137, as shown, if desired. Bores 141 are provided in the platforms 32 in alignment with the studs 140 when the platforms are in elevated position, as shown in dash line in Fig. 3. When it is desired to retain the platforms in their upwardly pivoted position, the bracket arm extensions 132 are slid inwardly on the bracket arms 131, the brackets 28 and their platforms pivoted upwardly, and the bracket arm extensions slid outwardly to bring the studs 140 into engagement with the bores 141. So associated, the bracket arms and their bracket extensions dependently support the platforms in elevated position for earth traversing movement. The studs are conveniently maintained in bore engagement by pins 142 passed through the outer end portions of the studs.

It will be apparent that the forwardmost packing station is the preferred location from which to control the speed of conveyance of fruit by the conveyor 39. For this purpose a control rod 145 is slidably mounted along side of the table 35 and provides a handle 146 at said forwardmost packing station. Rock arms 147 and 148 are downwardly extended from the control shafts 67 and 57, respectively, and interconnected by means of a rigid link 149. The link is pivotally connected to the bracket arms and preferably provides a series of bores 150 therethrough arranged in alignment longitudinally of the link so that adjustment of the relatively rocked positions of the shafts 57 and 67 can be conveniently accomplished. The rearward end portion of the control rod 145 is pivotally connected to the rock arm 147.

So that the clutch 99 can be manipulated from the forwardmost packing station, a control yoke 153, having connection with the clutch, is pivotally mounted in the engine frame 45, as at 154. A clutch rod 155, having a crank lever 156 located in the forwardmost packing station, is rotatably mounted alongside the table 35. As shown in Fig. 6, the clutch rod provides a radially extended operating arm 157 adjacent to the control yoke 153 and a rigid link 158 pivotally connected therebetween.

Posts 160 are upwardly extended from the top portion 26 of the frame 10 and mount transverse members 161 horizontally therebetween in positions elevated above the conveyor 39. A container chute 162 is mounted in a slightly forwardly inclined attitude on the members 161. It is preferred that the chute depart from horizontal position in its inclination only slightly so that containers 135, such as lug boxes, do not become so tightly nested as to make their removal therefrom difficult. It has been found that with the chute inclined only an inch or two for each eight or ten feet the containers are jostled down the chute during earth traversing movement of the frame and yet not so precipitously as to cause tight engagement. A jostling loose association of containers is thus achieved in the chute with adequate feeding of new containers from the forward end portion thereof.

A rearwardly precipitously inclined cull chute 163 is mounted on cross members 164 secured in horizontal positions between the legs 25.

As a convenience to packers working in the apparatus, a framework 165 of any desired form is mounted on the upper end portions of the posts 160 above the chute 162 and an awning 166 of canvas or other suitable material is stretched thereover. It will be obvious that the framework and awning may take many forms and that in certain environments, such as orchards with low hanging branches, may be dispensed with entirely.

*Operation*

The operation of the device of the present invention is clearly apparent and is briefly summarized at this point to emphasize certain structural relationships of significance. The forward end portion 22 of the yoke 20 is connected to a wagon or truck, not shown, adapted to draw the apparatus through a field or orchard where fruit is being harvested. A supply of containers 135 are preferably carried on the truck or wagon and fed onto the forward end of the container chute 162 by an attendant, as needed. As previously mentioned, the slight forward inclination of the chute causes containers supported thereon to be jostled rearwardly in the frame during earth traversing movement of the apparatus. Further, the slight inclination permits the supplying of empty containers at a height equally convenient to the packers at opposite ends of the apparatus. It is also convenient for the attendant to locate a cull box, indicated at 170, on the draft yoke 20 to receive culls deposited in the cull chute 163 and as the box becomes filled to transfer the culls to the wagon or truck.

The apparatus is towed through a field or orchard being harvested and fruit pickers deposit the harvested fruit 85 in the hopper 55. The floor boards 49 facilitate approach to the hopper from either side thereof by the pickers. The fruit gravitates toward the forward end of the hopper 55 and into the defuzzing trough 62. The rotation of the brushes defuzzes and/or cleans the fruit and gradually conveys the same to the discharge end of the trough. The sheet 84, weighted down by the bars 83, maintains the fruit in brush engagement for cleaning and defuzzing efficiency. The fruit is discharged from the defuzzing trough 62 onto the rearward end of the conveyor 39 and is carried by the conveyor forwardly in the frame across the table 35. The rigid mounting of the table on the frame assures that the jostling incident to earth traversing movement of the frame is transmitted to the table and aids in distributing the fruit transversely of the conveyor as it is moved longitudinally thereof for inspection and selection convenience.

The apparatus is drawn slowly through fields and orchards where harvesting is taking place so that the hopper 55 is always in convenient proximity to the point of harvest of the fruit. This saves substantial harvesting time and obviates the necessity of depositing fruit from a harvesting bucket or pan into a picking box preliminary to transporting to a packing shed. The platforms 32 are provided below and rearwardly of the bracket arms 131 on the left side of the conveyor and below and forwardly of the bracket arms on the right side of the conveyor. The packers, not shown, stand on the platforms 32 and face their respectively adjacent bracket arms 131. Containers 135 are selected from the container chute 162 and rested on the bracket arms 131 and bracket arm extension 132. To facilitate retention of the containers in place, the lowermost of the bracket arms and bracket arm extensions are preferably of angle iron construction providing a flat extended toward their respective higher bracket arms and bracket arm extensions and a flat upwardly extended against which ends of the containers may be rested. As previously described, the telescopic association of the bracket arms and bracket arm extensions accommodate containers of various sizes and of selected number.

Fruit is selected from the conveyor 39 and packed in the containers 135 by packers skilled in such operations. Culls are deposited in the cull chute 163 for gravitation into the cull box 170. The packer in the forwardmost of the packing stations 130 observes the rate of flow of fruit 85 on the conveyor and interrupts the travel of the conveyor at will by manipulation of the clutch lever 156. The rate of supply of fruit to the packers is regulated by the forwardmost thereof by manipulation of the handle 146 which when drawn forwardly rotates the rock shafts 57 and 67 simultaneously to lower the rearward end of the hopper and raise the forward end of the defuzzing trough 62. This results in a reduction in the gravitational flow of fruit 85 from the hopper 55 into the defuzzing trough 62 and in a retaining of the fruit of the defuzzing trough for a slightly greater length of time. To increase the fruit supply to the packing stations 130, the handle 146 is moved rearwardly rotating the rock shafts 57 and 67 to raise the rearward end portion of the hopper 55 and to lower the forward end portion of the defuzzing trough 62. When a packer fills a container 135 with fruit 85 the container is usually shoved outwardly on the bracket arms extensions and an empty container selected from the chute 162 and deposited in its place for continued packing with no appreciable interruption. An attendant removes the packed containers from the bracket arm extensions for subsequent lidding and transporting to market. For transporting, storing, and the like, the platforms 32 are pivoted upwardly, the studs 140 engaged in the bores 141, and locked in position by the pins 142.

An attendant on a leading wagon or truck supplies empty containers to the forward end portion of the chute 162 and removes culls from the box 170. A second attendant removes filled containers from the bracket arms extensions 132. Two attendants service the apparatus of the present invention, the pickers who empty the harvested fruit into the hopper, and the packers who selected and pack the same. This is as few attendants as required to service the same number of packers in conventional packing sheds.

In actual practice it has been found that employment of the packing apparatus of the present invention permits the harvesting of fruit one or two weeks later than is required when the fruit is handled and packed in the usual manner. Use of the apparatus assures the farmer higher quality fruit, greater weight, and less loss. The consumer benefits in receiving fruit at a lower price because of the eliminated waste and the elimination of handling steps no longer required. The consumer also is assured improved quality in the fruit because of the greater maturity permitted before harvest and the greatly reduced handling time and extent.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. In a mobile packing apparatus adapted for orchard and field use, the combination of an elongated mobile support frame having a forward end portion and a rearward end portion, a hopper having a forward end portion pivotally mounted in the rearward end portion of the frame for movement about a substantially horizontal axis transversely of the frame and rearwardly extended therefrom, a forwardly inclined defuzzing trough having a rearward end portion adapted to receive fruit from the forward end portion of the hopper pivotally mounted for movement about a substantially horizontal axis transversely of the frame and forwardly extended therefrom, an elongated endless conveyor mounted longitudinally of the frame having a rearward end portion adapted to receive fruit from the forward end portion of the defuzzing trough, said conveyor traversing a plurality of fruit packing stations on opposite sides thereof, and control means manipulable from the forward end portion of the frame adjacent to a packing station having connection with the forward end portion of the defuzzer trough and the rearward end portion of the hopper adapted oppositely to regulate the elevations of said rearward end portion of the hopper and forward end portion of the defuzzing trough.

2. In a mobile packing apparatus adapted for orchard and field use, the combination of an elongated mobile support frame having a forward end portion and a rearward end portion, a hopper having a forward end portion pivotally mounted in the rearward end portion of the frame for movement about a substantially horizontal axis transversely of the frame and rearwardly extended therefrom, a forwardly inclined defuzzing trough having a rearward end portion adapted to receive fruit from the forward end portion of the hopper pivotally mounted for movement about a substantially horizontal axis transversely of the frame and forwardly extended therefrom, an elongated endless conveyor mounted longitudinally of the frame having a rearward end portion adapted to receive fruit from the forward end portion of the defuzzing trough, said conveyor traversing a plurality of packing stations on opposite sides thereof, brackets adapted to support fruit packing containers mounted adjacent to the conveyor at the packing stations, said brackets being borne by the frame and laterally extended to opposite sides of the conveyor, support platforms dependently mounted on the frame, the platforms on the left of the frame being provided rearwardly adjacent and below the brackets of each packing station and the platforms on the right side of the conveyor being provided forwardly and below the brackets of each packing station on the right side of the conveyor, an elongated cull chute mounted in the frame below the conveyor in a rearwardly inclined attitude, a forwardly inclined container chute mounted on the frame in an elevated position above the conveyor, and means having driving connection with the conveyor motivating the conveyor with the upper run thereof rearwardly traveled in the frame, the conveyor and the container chute being solidly mounted in the frame whereby jostling of the frame incident to earth traversing movement is communicated directly to said conveyor and said chute.

3. A mobile fruit packing apparatus comprising an elongated mobile frame having forward and rearward end portions, a hopper mounted in an elevated position at one end of the frame adapted to receive fruit in bulk, an elongated endless conveyor mounted longitudinally of the frame adapted to receive fruit from the hopper and to convey it forwardly in the frame, said conveyor traversing a plurality of packing stations on opposite sides thereof, telescopic brackets mounted on the frame and laterally extended to opposite sides of the conveyor at the packing stations adapted to support containers for fruit adjacent to the conveyor, support platforms dependently mounted on the frame for pivotal movement about axes longitudinally of the frame, and studs endwardly extended from the telescopic brackets, the platforms having bores formed therein engageable by the studs when the platforms are pivoted upwardly for support of the platforms in pivotally elevated position by the brackets.

4. A mobile earth traversing fruit packing apparatus for field and orchard use comprising an elongated frame having forward and rearward end portions, axles mounted transversely on the frame in substantially fixed elevational relation thereto, ground engaging wheels journaled on the axles, the frame providing a plurality of upwardly extending support legs rigidly connected to the axles for unitary elevational movement therewith but permitting rotation of the axles relative to the legs, a top portion rigidly connected to the legs and a plurality of upwardly extending support posts rigidly connected to the top portion also for unitary elevational movement with the axles, a substantially horizontal endless conveyor adapted to receive fruit in bulk mounted longitudinally in the frame on the top portion, said conveyor traversing a plurality of fruit packing stations on opposite sides thereof, a rearwardly inclined cull chute rigidly connected to the support legs below the conveyor, and a slightly forwardly inclined fruit container delivery chute rigidly connected to the support posts above the conveyor, the cull chute and the delivery chute being constrained by said rigid mounting for elevational movement with the axles during earth traversing movement of the apparatus whereby jostling of the frame during such movement is communicated direct to said chutes.

5. In a mobile earth traversing fruit packing apparatus adapted for field and orchard use, the combination of an elongated frame having forward and rearward end portions, axles mounted in the frame, wheels rotatably mounted on the axles in supporting relation to the frame and in substantially fixed elevational relation thereto, the frame providing a plurality of upwardly extending support legs rigidly connected to the axles for unitary elevational movement therewith but permitting rotational movement of the axles, a top portion rigidly connected to the legs and a plurality of upwardly extending support posts rigidly connected to the top portion also for unitary elevational movement with the axles, a substantially horizontal elongated table rigidly mounted on the top portion longitudinally in the frame for jiggling movement during earth traversing movement of the frame, an endless conveyor mounted for endward circuitous travel about the table having an upper run rested on the table, means having driven connection with the conveyor motivating the upper run thereof forwardly in the frame, said conveyor traversing a plurality of fruit packing stations on opposite sides thereof, a hopper mounted in elevated position in the rearward end portion of the frame adapted to receive fruit in bulk and to supply such fruit to the rearward end portion of the conveyor, a rearwardly inclined cull chute rigidly mounted on the support legs below the conveyor intermediate the packing stations on opposite sides of the conveyor, and a slightly forwardly inclined fruit container delivery chute mounted rigidly on the support posts above the conveyor for jostling movement during earth traversing movement of the frame.

6. A mobile earth traversing fruit packing apparatus comprising an elongated mobile frame having forward and rearward end portions mounted for longitudinal earth traversing movement and jostling during said movement, axles mounted in the frame, wheels rotatably mounted on the axles in supporting relation to the frame and in substantially fixed elevational relation thereto, the frame providing a plurality of upwardly extending support legs rigidly connected to the axles for unitary elevational movement therewith and free rotation of the axles, a top portion rigidly connected to the legs, and a plurality of upwardly extending support posts rigidly connected to the top portion also for unitary elevational movement with the axles; a hopper mounted in an elevated position at one end of the frame adapted to receive fruit in bulk; an elongated endless conveyor mounted longitudinally of the frame adapted to receive fruit from the hopper and to convey it forwardly in the frame, said conveyor traversing a plurality of packing stations on opposite sides thereof; brackets borne by the frame and laterally extended to opposite sides of the conveyor at the packing stations adapted to support containers for fruit; support platforms dependently mounted on the frame, the brackets of each packing station on the left side of the conveyor having a platform rearwardly therebelow and the brackets of each packing station on the right side of the conveyor having a platform forwardly therebelow; an elongated cull chute rigidly mounted on the support legs below the conveyor in a rearwardly inclined position; and a forwardly inclined container chute rigidly mounted on the support posts in an elevated position above the conveyor, the chutes being rigidly mounted in the frame for unitary jostling movement therewith during earth traversing movement.

References Cited in the file of this patent

UNITED STATES PATENTS

| | | |
|---|---|---|
| 1,363,395 | Crook | Dec. 28, 1920 |
| 1,366,169 | Davis | Jan. 18, 1921 |
| 1,492,178 | Nicholas | Apr. 29, 1924 |
| 2,321,387 | Jackson | June 8, 1943 |
| 2,376,587 | Diller | May 22, 1945 |
| 2,378,418 | Lister | June 19, 1945 |
| 2,473,587 | Huston | June 21, 1949 |
| 2,510,541 | Beeson | June 6, 1950 |